United States Patent [19]

Meeker

[11] Patent Number: 4,554,196

[45] Date of Patent: Nov. 19, 1985

[54] HARDENED PORTION OF A FIBROUS PRODUCT AND A METHOD FOR PRODUCING THE SAME

[76] Inventor: Brian L. Meeker, 738 Kumler, Maumee, Ohio 43537

[21] Appl. No.: 544,477

[22] Filed: Oct. 24, 1983

[51] Int. Cl.[4] .................... B32B 31/00; F16B 37/12
[52] U.S. Cl. .................... 428/67; 52/309.2; 52/309.15; 52/787; 156/293; 403/267; 403/407.1; 411/82; 411/178; 411/180; 411/181; 428/99; 428/133; 428/137; 428/138; 428/194; 428/195
[58] Field of Search .............. 428/67, 99, 133, 137, 428/138, 194, 195; 52/309.2, 787, 309.15; 156/252, 257, 293; 403/267, 407; 411/82, 178, 180, 181

[56] References Cited

U.S. PATENT DOCUMENTS

| | | | |
|---|---|---|---|
| 1,564,948 | 12/1925 | Copeman | 52/787 |
| 1,926,679 | 9/1933 | Kellogg et al. | 52/787 |
| 2,511,168 | 6/1950 | Martin et al. | 156/293 |
| 2,702,761 | 2/1955 | Mannheim | 428/194 |
| 2,760,898 | 8/1956 | Voelker | 156/293 |
| 3,220,915 | 11/1965 | Shannon | 428/194 |
| 3,350,249 | 10/1967 | Gregoire | 52/309.2 |
| 3,570,074 | 3/1971 | Schimmeyer et al. | 403/267 |
| 3,650,878 | 3/1972 | Mattsson et al. | 156/293 |
| 4,044,501 | 8/1977 | Frydryk | 428/194 |
| 4,084,362 | 4/1978 | Piazza | 52/309.2 |
| 4,446,185 | 5/1984 | Waragai et al. | 428/67 |

Primary Examiner—James C. Cannon
Attorney, Agent, or Firm—Emch, Schaffer, Schaub & Porcello Co.

[57] ABSTRACT

A method for hardening a portion of a fiberglass product and fibrous product with a hardened portion are disclosed. A heated thermoplastic resinous material is applied to a fibrous product. The thermoplastic resinous material has a viscosity that allows the resin to permeate the fibrous product. THe resinous material is only applied to the portion of the fibrous product to be hardened. The resinous material is then cooled whereby the resinous material solidifies and the portion of the fibrous product permeated with the resins is substantially hardened.

11 Claims, 3 Drawing Figures

HARDENED PORTION OF A FIBROUS PRODUCT AND A METHOD FOR PRODUCING THE SAME

BACKGROUND OF THE INVENTION

This invention relates to an improved fibrous product and the method for producing such fibrous product. The invention is particularly useful in hardening a portion of a fibrous product and in securing fasteners to the fibrous product.

Fibrous products made of glass fibers and other types of fibers such as mineral fibers have been used for several years in various thermal and accoustical applications. Frequently, the fibrous material is formed into boards or panels that are secured to structural members. The panels can also be covered with a decorative material and positioned in rooms to improve accoustics in the room.

However, it is difficult to secure the fibrous products to structural members as fasteners such as screws or nails do not hold very well when positioned in the fibrous material. The fibers of the fibrous material normally crush when the fastener is inserted and do not form a secure bond with the fastener. This problem is accentuated if it is necessary to remove and reinsert the fastener in the same location on the fibrous product. The fastener tends to enlarge the opening in the fibrous product when it is removed and thereby reduces the quantity of material that can subsequently be used to secure the fastener when the fastener is reinserted. Also, the corners and edges of the fibrous product frequently do not have enough strength to withstand the forces encountered during handling and use without crushing or deforming. This problem is particularly significant when the product has well-defined or sharp corners or edges that must be maintained to preserve the appearance of the product. Accordingly, there is a need in the industry for a fibrous product that can be secured to structural member by fasteners and that has edges and corners that can withstand handling and use without deforming.

SUMMARY OF THE INVENTION

According to the invention there is provided a method for hardening a portion of a fibrous product. The method includes the step of heating a thermoplastic resinous material until the resinous material has a viscosity that allows the materials to permeate the fibrous product. The heated material is applied to a portion of the fibrous product whereby the heated material permeates the portion of the fibrous product. The resinous material is then cooled whereby the material solidifies. The portion of the fibrous product permeated with the resinous material is substantially hardened. In a preferred embodiment of the invention an aperture is created in a portion of the fibrous product prior to the application of the heated resinous material. The aperture can be created by drilling into the portion of the fibrous product. An insert is then positioned in the aperture after the application of the heated resinous material and before the resinous material cools. The resinous material acts to substantially bond the insert to the fibrous product when the resinous material cools. A screw may be positioned in an opening in the insert such that the screw specially engages the side of the opening whereby the screw is secured to the insert and fibrous product.

There is also disclosed a fibrous product having a panel of fibrous material. The panel has a first surface and a second surface where the first and second surface are in substantially opposed relationship. The panel has an edge that extends around the outer periphery of the panel between the first and second surfaces. A resinous thermoplastic material is positioned on a portion of the panel. The resinous material permeating said fibrous material and extending into the panel. The resinous material solidifies after permeating the panel whereby the resinous material hardens the portion of the panel.

It is an object of the invention to provide an improved method for hardening a portion of a fibrous product.

It is an additional object of the invention to provide an improved method for securing an insert in a fibrous product.

Other objects and advantages of the invention will become apparent as the invention is described hereinafter in more detail with reference to the accompanying drawings.

DESCRIPTION OF THE PREFERRED EMBODIMENT

This invention relates to an improved fibrous product and the method for producing such fibrous product. The invention is particularly useful in hardening a portion of a fibrous product. However, the invention can also be used for securing fasteners to the fibrous product. The features of this invention will be more fully understood by referring to the attached drawings in connection with the following description.

Figure 1:
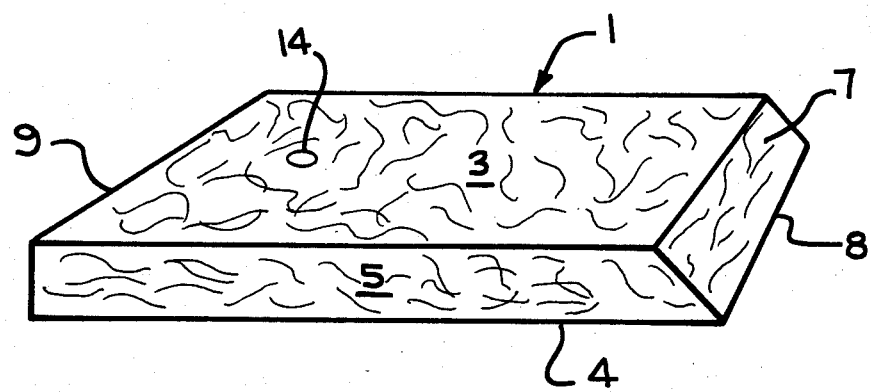
FIG. 1 is a perspective view of a portion of a fibrous product.
Figure 2:
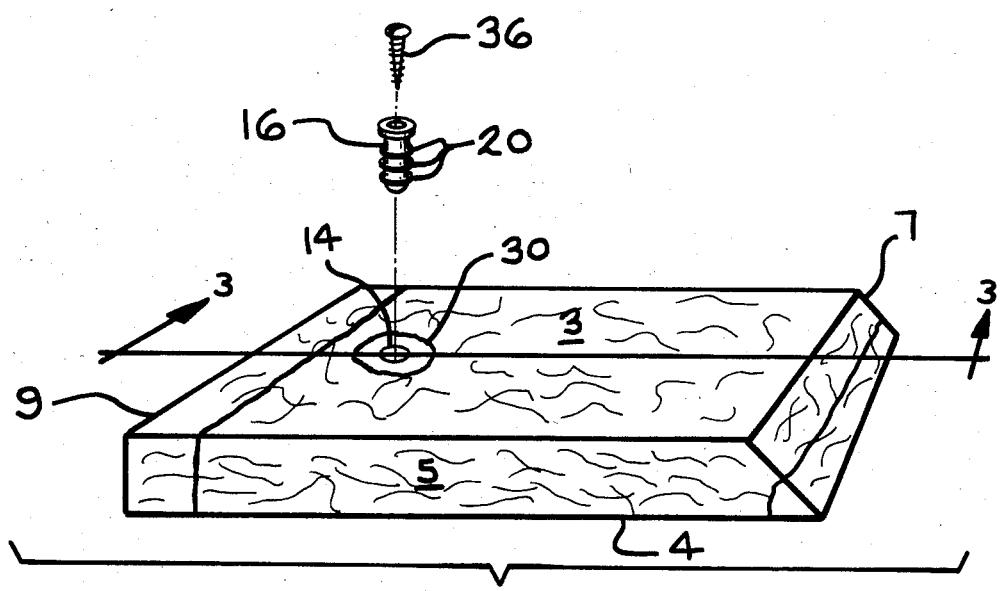
FIG. 2 is an exploded perspective view, according to the present invention.

FIG. 1 shows a portion of a fibrous product 1. The fibrous product 1 is generally made of a fibrous glass material although other types of fibrous material can be used with the invention. The fibrous product 1 has a first surface 3 and a second surface 4 that are in opposed and substantially parallel relationship. Two opposed and substantially parallel edges 5 extend between the first and second surfaces. A first end 7 extends between the first and second surfaces but the first end is disposed at an angle with respect to the first and second surfaces. The first end 7 forms a pointed or sharp corner 8 at the junction with the second surface 4. The second end 9 is disposed substantially perpendicular to the first and second surfaces of the fibrous product 1. The fibrous product 1 has the general shape of a panel. The fibrous product usually has a density from about 1 lb. per cubic foot to about 24 lbs. per cubic foot. Such fibrous glass panels are well-known in the art and are used as building construction materials or for automobile parts. An aperture 14 is positioned on the first surface 3 of the fibrous product 1. The aperture 14 extends inwardly towards the interior of the fibrous product 1. The aperture is disposed substantially perpendicular to the first surface of the fibrous product 1. The aperture 14 can be created by drilling into a portion of the fibrous product 1. The aperture 14 generally extends to a depth from about ¼ to about ¾ of the thickness of the fibrous product 1.

A material 30 is positioned around the aperture 14 in the fibrous material. Normally, the aperture 14 is located substantially in the center of the material 30. The material is in the molten state when it is applied to the first surface 3 of the fibrous material. The material must be sufficiently molten or liquid that it can permeate into the fibrous product 1. The material penetrates into the interior of the fibrous material to a depth of about $\frac{1}{8}$ to about $\frac{3}{4}$ of the thickness of the fibrous product 1. The material 30 extends around the aperture a distance from about 1½ to about 5 times the diameter of the aperture 14. The material is normally applied to an area of the fibrous product having a cross-sectional area that is from about 2 to about 5 times the cross-sectional area of the aperture. Usually, the material 30 is applied in a substantially circular area around the aperture and the aperture is located in substantially the center of said material. The material 30 usually has a relatively high solidification point so that the material readily solidifies at room temperature after it has been applied to the fibrous product.

Waxes and thermoplastic resinous materials can be used as the material 30. In practice it has been found that carnauba wax works particularily well as the heat softenable material 30.

Figure 3:
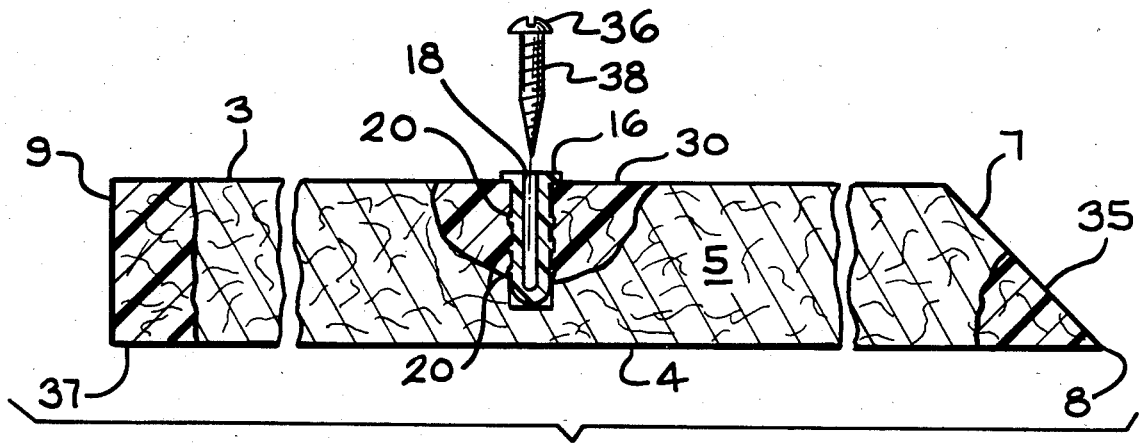
FIG. 3 is an exploded, partially assembled, cross-sectional view taken along the line 3—3 in FIG. 2.

FIG. 3 shows an insert 16 positioned in the aperture 14. The insert 16 generally has a diameter that is slightly larger than the diameter of the aperture 14. The insert 16 is generally made of a substantially rigid plastic material. The insert 16 can include at least one ridge 20 which extends radially from the exterior surface of the insert 16. The ridge 20 act to engage the surface of the aperture to assist in securing the insert 16 in the aperture 14. The insert 16 defines an axially extending opening 18. The opening 18 is normally positioned in substanially the center of the insert 16.

The insert 16 is positioned in the aperture 14 while the material 30 is still in a softened condition. The material 30 is positioned around the entire outer circumference of the insert 16. Usually the material 30 extends from the first surface 3 to a depth that is at least $\frac{1}{4}$ of the length of the insert 16. After the insert 16 is positioned in the aperture 14 the material 30 is then cooled such that the material 30 solidifies. The portion of the fibrous product permeated with the material 30 is then substantially hardened. The insert 16 is bonded to the fibrous product by the hardened material 30. The ridges 20 on the insert act to further secure or anchor the insert 16 in the aperture 14.

A screw 36 can be positioned in the opening 18 in the insert 16. The screw 36 usually has a diameter that is slight larger than the diameter of the opening 18. The screw 36 generally has a plurality of threads 38 which frictionally engage and cut complimentary threads in the sides of the opening 18 in the insert 16 when the screw 36 is inserted into the insert 16. The insert 16 is expanded radially against the material 30 and fibrous product 1 when the screw 36 is positioned in the opening 18 in the insert 16 as the screw is larger than the opening 18. This acts to securely position the insert 16 in the fibrous material of the fibrous product.

Since the screw 36 frictionally engages and cuts threads in the opening 18 of the insert 16, the screw can be removed and reinserted into the insert repeatedly without seriously impairing the holding power of the screw. The insert 16 is securely bonded to the fibrous product by the hardened material 30 so that the insert is not significantly effected by the removal and reinsertion of the screw 36. Thus, the material 30 produces a hardened area on the fibrous product and this hardened area in combination with the insert 16 provides a mechanism whereby fasteners can be effectively secured to a product made of fibrous material.

It should be understood that it is not always necessary to position the insert 16 is the aperture 14 in the fibrous material. In some applications, the screw 36 can be positioned directly in the aperture 14 once the resinous material 30 has solidified and hardened. However, the screw usually will have less holding force without the insert. Further, the holding force of the screw will usually significantly decrease if the screw is removed and reinserted into the aperture.

The material 30 can also be applied as previously described to first end 7 of the fibrous product 1. The material 30 is applied in a heated liquid state such that the material 30 permeates the fibrous product 1. The material 30 is then cooled to solidify the material and to form a hardened area 35 on the edge 7 of the fibrous product 1. The hardened area 35 includes the sharp corner 8 and allows the corner 8 to remain in the shape shown during handling and use of the fibrous product. In this manner sharp edges and corners can be maintained on the fibrous product without increasing the density of the fibrous material of entire fibrous product.

The material 30 can also be applied, as previously described, to the second end 9 of the fibrous product. The material 30 is applied in a heated liquid state so that the material permeates the fibrous material of the fibrous product 1. The material is then cooled to solidify the material and to form a hardened area 37 on the second end 9.

From the above it can be seen that the heat softenable material 30 can be used to harden various portions of a product made of fibrous material or to secure fasteners to such a fibrous product.

The above detailed description of the invention is given only for the sake of explanation. Modifications and substitutions other than those cited can be made without departing from the scope of the invention as defined in the following claims.

What I claim:

1. A method for hardening a portion of a fibrous product comprising the steps of:
    creating an aperture in said portion of said fibrous product, said aperture extending into the interior of said fibrous product, applying a heated thermoplastic resinous material to said portion of said fibrous product after the formation of said aperture, said thermoplastic resinous material having a viscosity that allows said resinous material to permeate said portion of said fibrous product, said resinous material permeating partially through the thickness of said fibrous product whereby said heated resinous material permeates said portion of said fibrous product that is to be hardened, positioning an insert in said aperture after said application of said heated resinous material, cooling said heated resinous material whereby said resinous material substantially acts to bond said insert to said fibrous product when said resinous material cools.

2. The method of claim 1 in which said insert has an opening, said opening being disposed for removably receiving a screw, said screw having a plurality of threads which frictionally engage the sides of said opening in said insert whereby said screw is secured to said insert and said fibrous product.

3. The method of claim 2 in which said insert expands radially against said resinous material when said screw is positioned in said opening in said insert.

4. The method of claim 1 in which said hardened portion has a cross-sectional area that is from about 2 to about 5 times the cross-sectional area of said insert.

5. The method of claim 4 in which said area of said hardened portion is substantially circular in shape and said insert is positioned is substantially the center of said hardened portion.

6. The method of claim 1 in which said insert is positioned in substantially the center of said hardened portion.

7. The method of claim 1 in which said resinous material permeates said fibrous product to a depth of at least ¼ of the distance that said insert extends into said fibrous product.

8. The method of claim 1 wherein said resinous material permeates said fibrous product to a depth from about ⅛ to about ¾ of the thickness of said fibrous material.

9. A method for hardening a portion of a fibrous product comprising the steps of:
forming an aperture in said portion of said fibrous product that is to be hardened;
applying a heated thermoplastic resinous material to said portion of said fibrous product, said resinous material being heated to an extent where said resinous material has a viscosity that allows said resinous material to permeate said fibrous product, said resinous material extending into said fibrous product to permeate said fibrous product to a depth from about ⅛ to about ¾ of the thickness of said fibrous product, said aperture being disposed substantially in the center of said resinous material, said resinous material having a cross-sectional area that is from about 2 to about 5 times the cross-sectional area of said aperture;
positioning a plastic insert in said aperture while said resinous material is still hot, said insert extending into said fibrous product, said insert defining an opening in substantially the center of said insert, said opening extending in a direction into said fibrous product, said opening being disposed for removably receiving a screw whereby said screw can be secured to said insert; and
cooling said resinous material to solidify and harden said resinous material whereby said resinous material hardens said portion of said fibrous material and securely bonds said insert to said fibrous product.

10. The method of claim 9 in which said thermoplastic resinous material is carnauba wax and said fibrous product is a glass fiber material.

11. A fibrous product comprising:
a panel of fibrous material having a first surface and a second surface, said first and second surfaces being in substantially opposed relationship, said panel having an edge that extends around the outer periphery of said panel between said first and second surfaces, a hardened portion located on a portion of said panel, said hardened portion being permeated with a resinous thermoplastic material, an aperture positioned in said hardened portion of said panel, said aperture extending from said first surface into said fibrous material in a direction towards said second surface and a plastic insert positioned in said aperture in said panel, said insert defining an opening, said opening being disposed for removably receiving a screw whereby said screw can be secured to said insert, said insert being secured to said aperture in said panel by said resinous material.

* * * * *